United States Patent
Tamaru et al.

(10) Patent No.: US 11,447,081 B2
(45) Date of Patent: Sep. 20, 2022

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Hiroki Tamaru, Yokkaichi (JP); Yuichi Kimoto, Yokkaichi (JP); Yasushi Itani, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/270,699

(22) PCT Filed: Aug. 22, 2019

(86) PCT No.: PCT/JP2019/032812
§ 371 (c)(1),
(2) Date: Feb. 23, 2021

(87) PCT Pub. No.: WO2020/050045
PCT Pub. Date: Mar. 12, 2020

(65) Prior Publication Data
US 2021/0331633 A1  Oct. 28, 2021

(30) Foreign Application Priority Data
Sep. 5, 2018  (JP) .............................. JP2018-165709

(51) Int. Cl.
*H02G 3/04* (2006.01)
*B60R 16/02* (2006.01)

(52) U.S. Cl.
CPC ....... *B60R 16/0215* (2013.01); *H02G 3/0412* (2013.01); *H02G 3/0487* (2013.01)

(58) Field of Classification Search
CPC ... F16L 59/141; F16L 7/00; F16L 9/18; F16L 59/065; F16L 53/38; F16L 599/12;
(Continued)

(56) References Cited

U.S. PATENT DOCUMENTS 201,697 A * 3/1878 Milligan ................... F16L 3/04
248/74.5
1,181,310 A * 5/1916 Hodgman ............. B08B 9/0553
15/104.18
(Continued)

FOREIGN PATENT DOCUMENTS

JP  2012-152045 A  8/2012
JP  2012-235666 A  11/2012
(Continued)

OTHER PUBLICATIONS

Nov. 12, 2019 International Search Report issued in International Patent Application No. PCT/JP2019/032812.

*Primary Examiner* — Krystal Robinson
(74) *Attorney, Agent, or Firm* — Oliff PLC

(57) ABSTRACT

A wire harness having a bent router configured to be routed in a bent manner in a vehicle, the wire harness including: a wire; an exterior tube enclosing an outer peripheral surface of the wire; and a heat transfer tube having a rectangular tubular shape, provided between the wire and the exterior tube, and contacting an entire periphery of both the outer peripheral surface of the wire and an inner peripheral surface
(Continued)

of the exterior tube, wherein the wire has an exposed part not covered by the heat transfer tube.

16 Claims, 12 Drawing Sheets

(58) Field of Classification Search
CPC ..... F16L 9/19; F16L 9/20; F16L 11/22; F16L 1/16; F16L 7/02; F16L 59/14; F16L 39/005; F16L 25/01; F16L 3/2235; F16L 3/237; F16L 3/22; F16L 59/143; F16L 2201/30; F16L 5/08; F16L 1/123; F16L 59/125; F16L 59/153; F16L 3/02; F16L 3/233; F16L 27/111; F16L 53/30; F16L 59/20; F16L 1/028; F16L 3/223; F16L 3/24; F16L 5/14; F16L 55/1656; F16L 5/02; F16L 55/18; F16L 5/04; F16L 3/015; F16L 3/222; F16L 47/03; F16L 51/027; F16L 59/075; F16L 11/082; F16L 11/127; F16L 3/12; F16L 3/04; F16L 3/137; F16L 1/23; F16L 3/13; F16L 3/26; F16L 53/37; F16L 11/16; F16L 27/0849; F16L 3/11; F16L 3/127; F16L 3/133; F16L 51/025; F16L 59/06; F16L 1/18; F16L 1/235; F16L 11/12; F16L 11/083; F16L 47/22; F16L 55/1654; F16L 11/10; F16L 55/162; F16L 1/10; F16L 27/1004; F16L 55/1651; F16L 59/00; F16L 1/032; F16L 11/20; F16L 3/14; F16L 55/165; F16L 59/021; F16L 39/00; F16L 5/10; F16L 9/14; F16L 1/26; F16L 3/16; F16L 55/1645; F16L 1/166; F16L 1/19; F16L 15/003; F16L 2101/30; F16L 3/243; F16L 33/01; F16L 58/181; F16L 11/121; F16L 15/08; F16L 21/08; F16L 39/04; F16L 5/00; F16L 55/40; F16L 57/00; F16L 59/029; F16L 9/02; F16L 1/163; F16L 3/00; F16L 3/221; F16L 41/021; F16L 55/035; F16L 55/1652; F16L 55/1658; F16L 57/06; F16L 9/00; F16L 1/036; F16L 53/34; F16L 58/06; F16L 59/026; F16L 59/10; F16L 9/147; F16L 1/06; F16L 1/161; F16L 1/24; F16L 27/12; F16L 3/08; F16L 3/10; F16L 3/227; F16L 55/00; F16L 55/1655; F16L 59/147; F16L 11/08; F16L 11/081; F16L 11/15; F16L 21/04; F16L 55/1657; F16L 59/027; F16L 59/028; F16L 59/13; F16L 59/163; F16L 1/11; F16L 11/00; F16L 3/1075; F16L 3/20; F16L 37/36; F16L 55/1653; F16L 58/16; F16L 59/04; F16L 59/08; F16L 9/08; F16L 1/038; F16L 1/20; F16L 1/207; F16L 11/04; F16L 13/02; F16L 2201/10; F16L 3/01; F16L 3/2056; F16L 37/08; F16L 41/023; F16L 51/026; F16L 59/187; F16L 9/16; F16L 13/0272; F16L 15/009; F16L 2201/20; F16L 2201/40; F16L 23/02; F16L 27/11; F16L 3/1091; F16L 3/23; F16L 55/10; F16L 55/1007; F16L 55/1015; F16L 55/1022; F16L 55/164; F16L 55/26; F16L 57/04; F16L 58/1036; F16L 59/184; F16L 59/21; F16L 59/22; F16L 9/121; F16L 9/125; F16L 9/127; F16L 11/115; F16L 11/118; F16L 23/04; F16L 3/1207; F16L 47/20; F16L 5/06; F16L 53/32; F16L 53/70; F16L 55/163; F16L 59/02; F16L 59/123; F16L 59/18; F16L 9/12; F16L 9/153; H02G 9/06; H02G 3/0481; H02G 3/22; H02G 3/32; H02G 15/34; H02G 1/08; H02G 3/30; H02G 15/013; H02G 1/06; H02G 3/0406; H02G 15/10; H02G 1/14; H02G 3/0487; H02G 3/26; H02G 15/18; H02G 3/0412; H02G 3/263; H02G 11/00; H02G 3/04; H02G 3/0437; H02G 9/02; H02G 15/007; H02G 9/10; H02G 7/12; H02G 1/086; H02G 1/02; H02G 3/088; H02G 1/10; H02G 15/1806; H02G 3/0418; H02G 15/117; H02G 11/02; H02G 3/00; H02G 3/06; H02G 15/04; H02G 15/24; H02G 7/125; H02G 3/03; H02G 3/0462; H02G 3/185; H02G 9/08; H02G 11/006; H02G 15/076; H02G 3/24; H02G 15/08; H02G 7/14; H02G 3/34; H02G 15/003; H02G 15/06; H02G 15/103; H02G 15/192; H02G 3/086; H02G 3/0608; H02G 7/00; H02G 1/00; H02G 15/113; H02G 3/045; H02G 7/053; H02G 15/1833; H02G 3/0456; H02G 3/0493; H02G 5/063; H02G 13/80; H02G 15/068; H02G 3/0616; H02G 3/388; H02G 7/05; H02G 9/065; H02G 15/184; H02G 3/12; H02G 3/121; H02G 3/38; H02G 3/381; H02G 7/20; H02G 3/08; H02G 1/16; H02G 3/0431; H02G 3/083; H02G 1/04; H02G 15/02; H02G 15/22; H02G 3/0475; H02G 3/10; H02G 3/123; H02G 1/085; H02G 1/088; H02G 1/1265; H02G 15/046; H02G 15/085; H02G 3/14; H02G 5/061; H02G 7/02; H02G 15/064; H02G 15/20; H02G 3/0425; H02G 3/0666; H02G 3/16; H02G 3/305; H02G 9/04; H02G 1/083; H02G 15/072; H02G 3/081; H02G 3/386; H02G 5/068; H02G 7/16; H02G 3/0468; H02G 5/066; H02G 3/0691; H02G 5/065; H02G 3/18; H02G 3/28; H02G 1/145; H02G 15/105; H02G 15/115; H02G 15/1813; H02G 3/0683; H02G 3/266; H02G 3/40; H02G 15/043; H02G 3/383; H02G 3/0443; H02G 7/10; H02G 11/003; H02G 15/188; H02G 3/0641; H02G 3/085; H02G 3/105; H02G 5/00; H02G 1/005; H02G 1/12; H02G 15/00; H02G 15/196; H02G 3/0633; H02G 3/065; H02G 3/283; H02G 13/40; H02G 15/1055; H02G 3/285; H02G 3/286; B60R 16/0215; B60R 21/232; B60R 21/213; B60R 16/0207; B60R 21/26; B60R 11/0235; B60R 13/08; B60R 16/02; B60R 2011/0028; B60R 2011/0082; B60R 21/215; B60R 2011/0035; B60R 21/217; B60R 11/02; B60R 2021/23316; B60R 21/261; B60R 13/083; B60R 2021/23169; B60R 21/206; B60R 22/48; H01B 7/0045; H01B 7/04; H01B 7/00; H01B 7/009; H01B 17/58; H01B 9/00; H01B 7/0081

See application file for complete search history.

(56) References Cited

U.S. PATENT DOCUMENTS

| | | | | |
|---|---|---|---|---|
| 2,256,027 A * | 9/1941 | Jardine | | H01B 9/001 |
| | | | | 174/15.7 |
| 2,583,026 A * | 1/1952 | Swift | | H01B 7/188 |
| | | | | 264/171.18 |
| 3,060,069 A * | 10/1962 | Sindars | | F16L 59/022 |
| | | | | 29/445 |
| 3,749,813 A * | 7/1973 | Shealy | | H02G 7/14 |
| | | | | 174/42 |
| 4,458,105 A * | 7/1984 | Roenisch | | H01B 9/02 |
| | | | | 29/241 |
| 4,473,716 A * | 9/1984 | Jesseman | | B29C 67/00 |
| | | | | 174/113 A |
| 4,487,660 A * | 12/1984 | Netzel | | H01B 9/06 |
| | | | | 174/21 C |
| 5,164,546 A * | 11/1992 | Kumagai | | B60R 16/0215 |
| | | | | 439/459 |
| 9,050,934 B2 | 6/2015 | Toyama et al. | | |
| 9,534,708 B2 * | 1/2017 | Cripps, II | | F16L 3/221 |
| 9,776,581 B2 * | 10/2017 | Oga | | B60R 16/0215 |
| 9,819,164 B2 * | 11/2017 | Ichikawa | | B60R 16/0215 |
| 10,096,400 B2 * | 10/2018 | Ohkubo | | H05K 9/0098 |
| 2005/0103519 A1 * | 5/2005 | Brandsberg | | H01B 12/16 |
| | | | | 174/125.1 |
| 2009/0272576 A1 * | 11/2009 | Medina | | B60R 16/0215 |
| | | | | 174/72 A |
| 2014/0284102 A1 | 9/2014 | Ichikawa et al. | | |
| 2015/0053455 A1 * | 2/2015 | Hagi | | B60R 16/0215 |
| | | | | 174/113 C |
| 2018/0247741 A1 * | 8/2018 | Buck | | H01B 11/02 |
| 2019/0267151 A1 * | 8/2019 | Kusakari | | B21C 1/003 |
| 2019/0292632 A1 * | 9/2019 | Kusakari | | H01R 4/185 |
| 2021/0050128 A1 * | 2/2021 | Sahashi | | H01B 7/421 |

FOREIGN PATENT DOCUMENTS

| | | |
|---|---|---|
| JP | 2013-135540 A | 7/2013 |
| JP | 5491224 B2 | 5/2014 |
| JP | 2015-41563 A | 3/2015 |
| JP | 2017-91800 A | 5/2017 |

\* cited by examiner

WIRE HARNESS

BACKGROUND

The technology disclosed in the present specification relates to wire harnesses.

A known example of a conventional wire harness is a wire harness disclosed in the following JP 5491224. This wire harness is provided with a plurality of insulated wires that are approximately rectangular in cross-section, a protective tubular member that is installed on the outer side of the plurality of insulated wires such that wires are inserted therein, and a metal heat transfer member that contacts the inner surface of the protective tubular member.

The heat transfer member is installed to enclose approximately the entirety of the plurality of insulated wires in an extending direction of the plurality of insulated wires, which are arranged to be approximately square in cross-section or approximately rectangular in cross-section.

The heat transfer member and the protective tubular member come in contact due to the self-weight of the insulated wires. Heat generated by the insulated wires is thereby conducted from the heat transfer member to the protective tubular member and dissipated externally.

SUMMARY

However, there is a problem in that the insulated wires increase in weight, given that the heat transfer member is installed to enclose approximately the entirety of the plurality of insulated wires in the extending direction.

The wire harness according to an exemplary aspect includes a wire harness having a bent router configured to be routed in a bent manner in a vehicle, the wire harness including a wire, an exterior tube enclosing an outer peripheral surface of the wire, and a heat transfer tube provided between the wire and the exterior tube and contacting both the wire and the exterior tube, and the wire having an exposed part not covered by the heat transfer tube.

The wire has an exposed part not covered by the heat transfer tube, thus enabling an increase in the weight of the wire harness to be suppressed, as compared with a configuration in which the wire does not have an exposed part.

Also, a configuration may be adopted in which the heat transfer tube is provided in plural at a predetermined interval from each other in an extending direction of the wire, the exposed part is located between the plurality of heat transfer tubes, and at least one of the plurality of heat transfer tubes is arranged in the bent router.

A plurality of heat transfer tubes are provided at a predetermined interval from each other in the extending direction of the wire, and at least one of the plurality of heat transfer tubes is arranged in the bent router, thus enabling the flexibility of the wire harness to be ensured while ensuring heat dissipation in the bent router.

Also, a configuration may be adopted in which an inner peripheral surface of the exterior tube contacts an entire periphery of the heat transfer tube, and the heat transfer tube contacts an entire periphery of the outer peripheral surface of the wire.

The inner peripheral surface of the exterior tube contacts the entire periphery of the heat transfer tube, and, furthermore, the heat transfer tube contacts the entire periphery of the outer peripheral surface of the wire, thus resulting in the heat transfer tube reliably contacting the wire and the exterior tube. The heat dissipation effect can thereby be improved, as compared with a configuration in which a heat transfer tube attached to the outer peripheral surface of the wire is brought in contact with an exterior tube by self-weight from only one direction, as is conventionally the case. Also, in the case where a heat transfer tube attached to the outer peripheral surface of the wire is brought in contact with an exterior tube by self-weight from only one direction, as is conventionally the case, there is a risk of not being able to obtain sufficient heat dissipation depending on the routing path of the wire harness, given that the contact surface area between the heat transfer tube and the exterior tube differs, depending on the portion (e.g., bent router, straight router, etc.) of the wire harness. With the above configuration, the heat transfer tube reliably contacts the wire and the exterior tube, thus enabling heat generated by the wire to be more efficiently dissipated to the exterior tube. Accordingly, heat dissipation of the wire harness can be improved.

Also, a configuration may be adopted in which the heat transfer tube includes a first heat transfer tube contacting the outer peripheral surface of the wire from one direction and a second heat transfer tube contacting the outer peripheral surface of the wire from another direction opposite to the one direction, and the wire is sandwiched by the first heat transfer tube and the second heat transfer tube.

The heat transfer tube includes a first heat transfer tube that contacts the outer peripheral surface of the wire from one direction and a second heat transfer tube that contacts the outer peripheral surface of the wire from another direction, and the wire is sandwiched by the first heat transfer tube and the second heat transfer tube, thus enabling the heat transfer tube to be reliably brought in contact with the wire.

Also, a configuration may be adopted in which the bent router includes a curved part that is curved and a non-curved part that is located on both sides of the curved part and is not curved, and the heat transfer tube is not provided in a position corresponding to the curved part.

Not providing a heat transfer tube in a position corresponding to the curved part of the wire harness enables the flexibility of the wire harness in the bent router to be further ensured.

Also, a configuration may be adopted in which the wire harness includes a fixing member attached on an outer peripheral surface of the exterior tube and configured to be fixed to the vehicle, and the fixing member is attached on the outer peripheral surface of the exterior tube at a position corresponding to the heat transfer tube.

A fixing member is attached on the outer peripheral surface of the exterior tube at a position corresponding to the heat transfer tube, thus enabling heat conducted from the wire to the heat transfer tube and the exterior tube to be quickly conducted to the fixing member and dissipated to a vehicle-side attachment part (e.g., vehicle panel) of the vehicle to which the fixing member is attached.

Also, a configuration may be adopted in which the fixing member is a band clip having a band part binding the exterior tube, and the inner peripheral surface of the exterior tube is displaced radially inward and contacts the heat transfer tube, due to the exterior tube being bound by the band part.

Configuring the fixing member as a band clip enables the inner peripheral surface of the exterior tube to be reliably brought in contact with the heat transfer tube. The heat transfer tube thereby also changes radially inward, thus enabling the exterior tube to be reliably brought in contact with the wire.

Also, a configuration may be adopted in which the exterior tube is a corrugated tube having annular raised and recessed corrugations in the extending direction, and the heat transfer tube has a raised part that fits into a recessed part in the corrugated tube and prevents displacement in the extending direction of the exterior tube.

Fitting a raised part of the heat transfer tube into a recessed part of the corrugated tube enables displacement of the heat transfer tube in the extending direction within the corrugated tube to be prevented.

According to the wire harness disclosed in the present specification, an increase in the weight of the wire harness due to the heat transfer tube can be suppressed.

DETAILED DESCRIPTION OF EMBODIMENTS

Embodiment 1

The present embodiment will be described, with reference to FIGS. 1 to 4.

Figure 1:
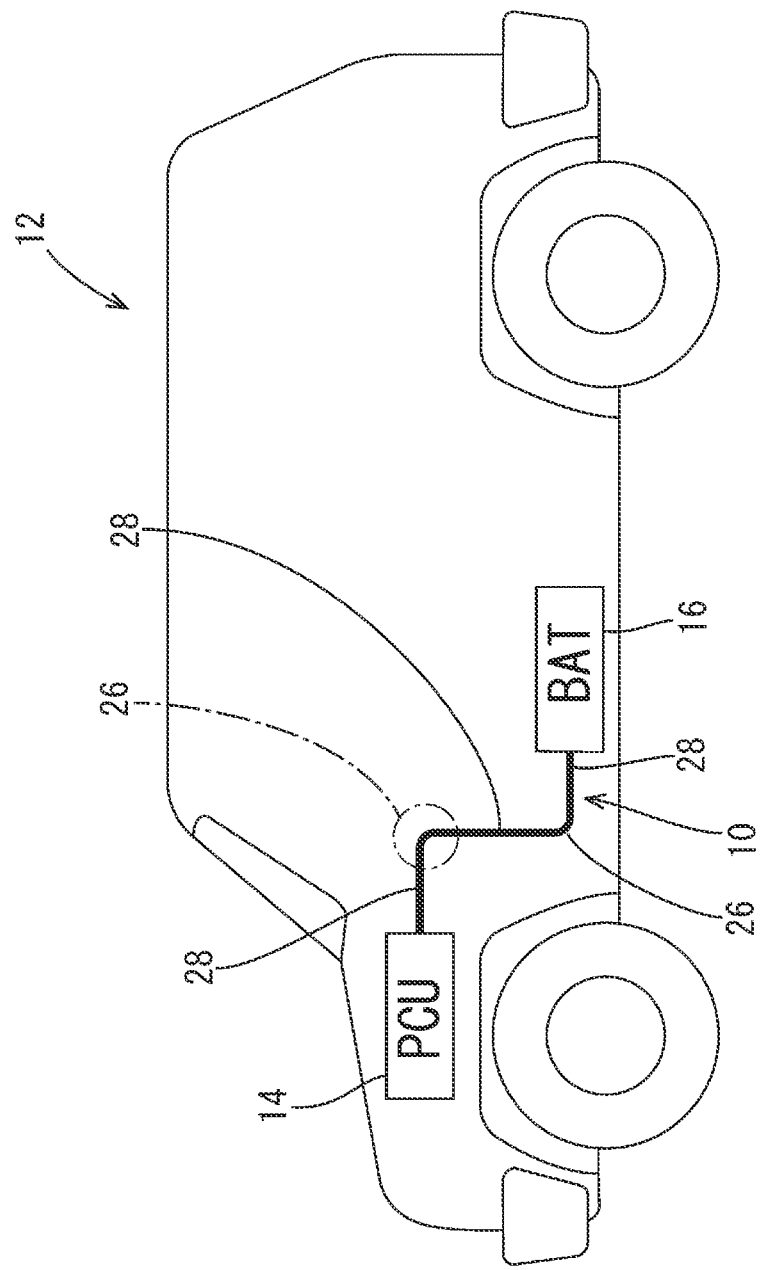
FIG. 1 is a diagram of a wire harness routed in a vehicle in Embodiment 1.
Figure 2:
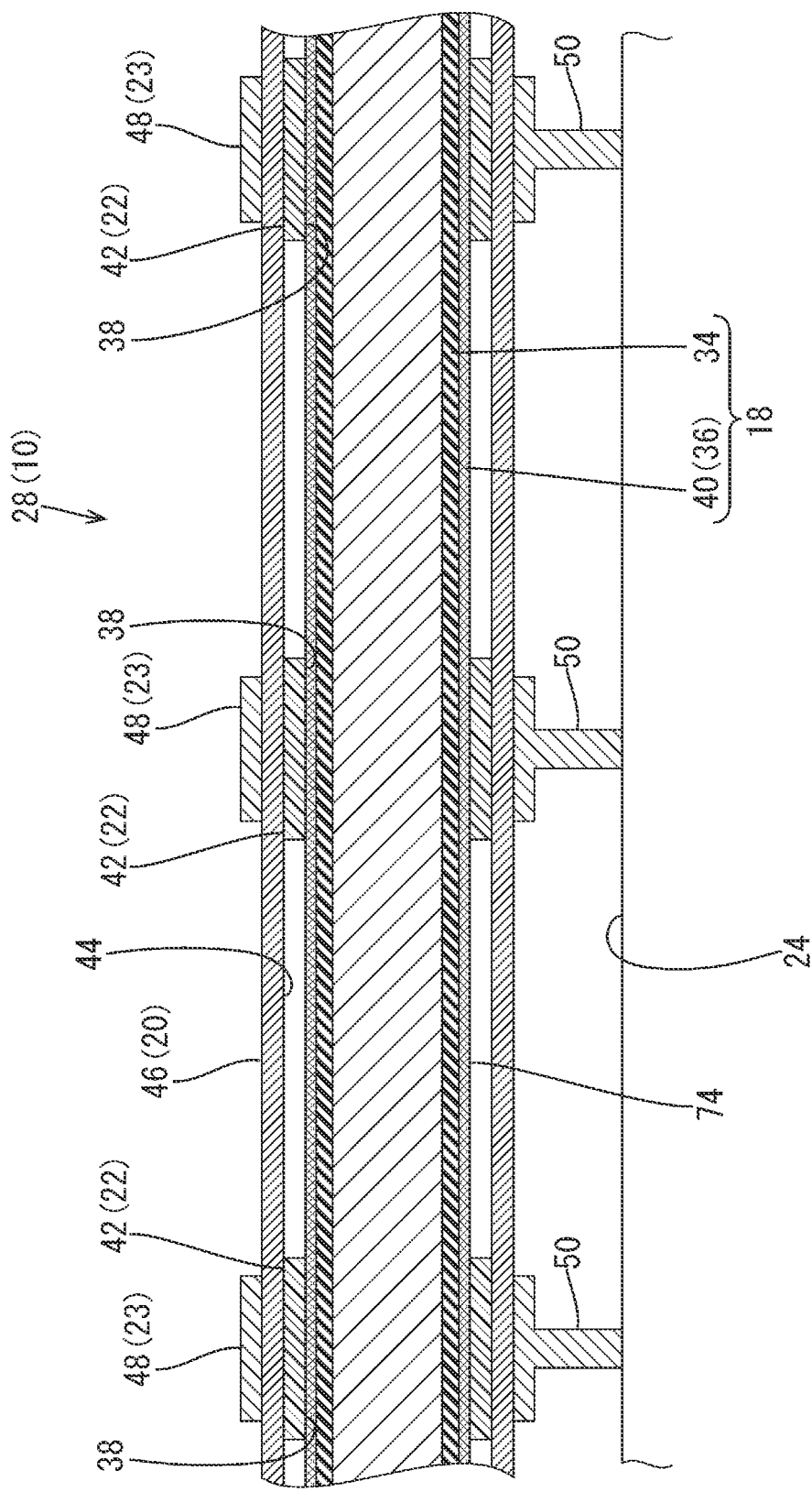
FIG. 2 is a sectional view of the wire harness in a state of being attached to a vehicle panel as seen from the side.
Figure 3:
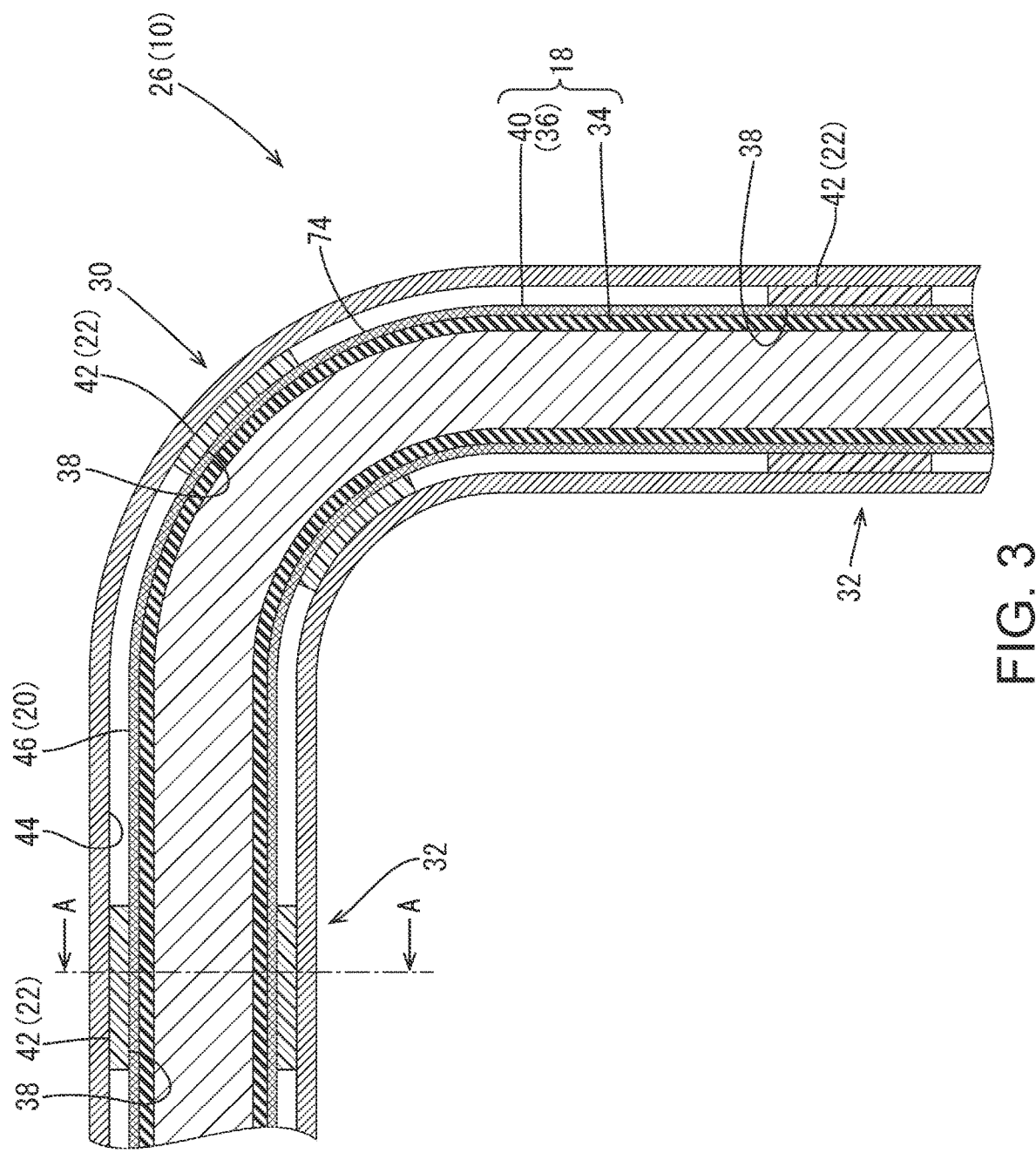
FIG. 3 is a sectional view of the wire harness in a bent routing portion as viewed from the side.

A wire harness 10 of the present embodiment is a wire harness 10 connecting between a PCU (Power Control Unit) 14 that is provided in an engine room of a vehicle 12 and a battery 16 provided near the middle of the vehicle 12, as shown in FIG. 1, and is provided with a wire 18, an exterior member 20 (exterior tube) that encloses the wire 18 and protects the wire 18, and a plurality of heat transfer members 22 (heat transfer tubes) provided between the wire 18 and the exterior member 20, as shown in FIG. 2. Also, the wire harness 10 is fixed to a vehicle panel 24 with a band clip (fixing member) 23, and has a bent routing portion 26 (bent router) that is routed in a bent manner in the vehicle 12, and a straight routing portion 28 that is routed in a straight manner, as shown in FIGS. 1 to 3. The bent routing portion 26 is constituted by a curved part 30 that is curved and a non-curved part 32 that is located on both sides of the curved part 30 and is not curved, as shown in FIG. 3.

Figure 4:
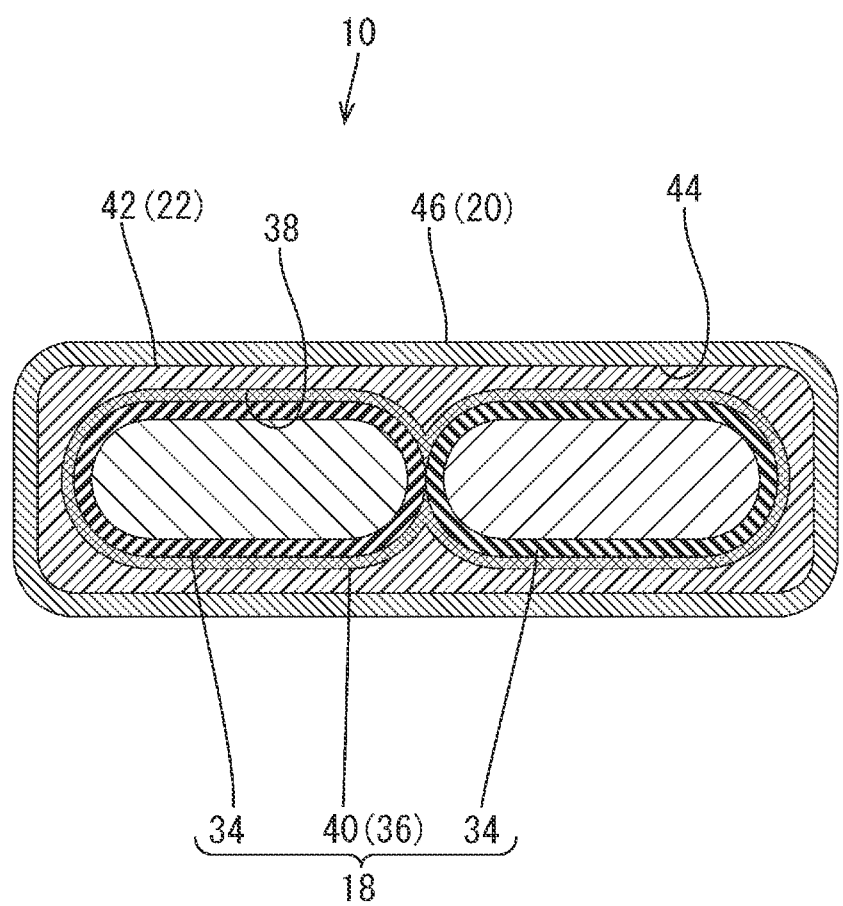
FIG. 4 is a sectional view taken along A-A in FIG. 3.

As shown in FIG. 4, the wire 18 is constituted by a pair of coated wires 34 having an oval shape in cross section, and a shield member 36 formed from braided wires obtained by braiding thin metal wires into a mesh, for example, and collectively enclosing the pair of coated wires 34. Here, the pair of coated wires 34 are stranded wires.

The exterior member 20 is a so-called corrugated tube, and has a rectangular tubular shape, and the wire 18 is inserted inside the exterior member 20.

As shown in FIGS. 2 to 4, the heat transfer member 22 has a rectangular tubular shape and is constituted by a resin material having thermal conductivity. As for the resin material constituting the heat transfer member 22, a silicone rubber is used, for example. Also, in order to improve the thermal conductivity of the heat transfer member 22, an inorganic material such as alumina may be added to the silicone rubber, for example. An inner peripheral surface 38 of the heat transfer member 22 contacts the entire periphery of an outer peripheral surface 40 of the wire 18, and an outer peripheral surface 42 of the heat transfer member 22 contacts the entire periphery of an inner peripheral surface 44 of the exterior member 20. The heat dissipation effect can thereby be improved, as compared with a configuration in which a heat transfer member attached to the outer peripheral surface of the wire is brought in contact with an exterior member by self-weight from only one direction, as is conventionally the case. Also, in the case of a configuration in which a heat transfer member attached to the outer peripheral surface of the wire is brought in contact with an exterior member by self-weight from only one direction, as is conventionally the case, there is a risk of not being able to obtain sufficient heat dissipation depending on the routing path of the wire harness 10, given that the contact surface area between the heat transfer member and the exterior member differs, depending on the portion (e.g., bent routing portion, straight routing portion, etc.) of the wire harness. In the present embodiment, the heat transfer member 22 reliably contacts the wire 18 and the exterior member 20, thus enabling heat generated by the wire 18 to be more efficiently dissipated to the exterior member 20. Accordingly, heat dissipation of the wire harness 10 can be improved.

As shown in FIGS. 2 and 3, a plurality of heat transfer members 22 are arranged in the bent routing portion 26 and the straight routing portion 28 at a predetermined interval from each other in the extending direction of the wire 18, and sections (i.e., between the plurality of heat transfer members 22) of the wire 18 that are not covered by the heat transfer members 22 are exposed parts 74. Having such exposed parts 74 enables an increase in the weight of the wire harness 10 to be suppressed, as compared with a configuration in which a heat transfer member 22 is provided along the entirety of the straight routing portion 28 and the bent routing portion 26 in the extending direction. Also, the flexibility of the wire harness 10 in the bent routing portion 26 can be ensured.

As shown in FIG. 2, the band clip 23 is provided on an outer peripheral surface 46 of the exterior member 20, and is constituted by a band part 48 that binds the exterior member 20 radially inward and an attachment part 50 that is attached to the vehicle panel 24. Due to the band clip 23 being provided in a position corresponding to the heat transfer members 22, and the exterior member 20 being bound by the band part 48, as shown in FIG. 2, the exterior member 20 is displaced radially inward, and the inner peripheral surface 44 of the exterior member 20 elastically contacts the outer peripheral surface 42 of the heat transfer member 22. Also, due to the exterior member 20 elastically contacting the heat transfer member 22, the heat transfer member 22 is displaced radially inward, and the inner peripheral surface 38 of the heat transfer member 22 elastically contacts the outer peripheral surface 40 of the wire 18. The heat transfer member 22 can thereby be reliably brought in contact with the exterior member 20 and the shield member 36. Also, the band clip 23 is attached on the outer peripheral surface 46 of the exterior member 20 at a position corresponding to the heat transfer member 22, thus enabling heat conducted from the wire 18 to the heat transfer member 22 and the exterior member 20 to be quickly conducted to the band clip 23, and dissipated to the vehicle panel 24 of the vehicle 12 to which the band clip 23 is attached.

According to the present embodiment as described above, the wire 18 has the exposed part 74 that is not covered by the heat transfer member 22, thus enabling an increase in the weight of the wire harness 10 to be suppressed, as compared with a configuration in which the wire does not have the exposed part 74.

Also, a plurality of heat transfer members 22 are provided at a predetermined interval from each other in the extending direction of the wire 18, and at least one of the plurality of heat transfer members 22 is arranged in the bent routing portion 26, thus enabling the flexibility of the wire harness 10 to be ensured, while ensuring heat dissipation in the bent routing portion 26.

Also, the inner peripheral surface 44 of the exterior member 20 contacts the entire periphery of the heat transfer member 22, and, furthermore, the heat transfer member 22 contacts the entire periphery of the outer peripheral surface 40 of the wire 18, thus resulting in the heat transfer member 22 reliably contacting the wire 18 and the exterior member 20. The heat dissipation effect can thereby be improved, as compared with a configuration in which a heat transfer member attached to the outer peripheral surface of the wire is brought in contact with an exterior member by self-weight from only one direction, as is conventionally the case. Also, in a configuration in which a heat transfer member attached to the outer peripheral surface of the wire is brought in contact with an exterior member by self-weight from only one direction, as is conventionally the case, there is a risk of not being able to obtain sufficient heat dissipation depending on the routing path of the wire harness 10, given that the contact surface area between the heat transfer member and the exterior member differs, depending on the portion (e.g., bent routing portion, straight routing portion, etc.) of the wire harness. In the present embodiment, the heat transfer member 22 reliably contacts the wire 18 and the exterior member 20, thus enabling heat generated by the wire 18 to be more efficiently dissipated to the exterior member 20. Accordingly, heat dissipation of the wire harness 10 can be improved.

Also, the band clip 23 is attached on the outer peripheral surface 46 of the exterior member 20 at a position corresponding to the heat transfer member 22, thus enabling heat conducted from the wire 18 to the heat transfer member 22 and the exterior member 20 to be quickly conducted to the band clip 23, and dissipated to a vehicle-side attachment part (e.g., vehicle panel 24) of the vehicle 12 to which the band clip 23 is attached.

Also, configuring the fixing member as the band clip 23 enables the inner peripheral surface 44 of the exterior member 20 to be reliably brought in contact with the heat transfer member 22. The heat transfer member 22 thereby also changes radially inward, thus enabling the exterior member 20 to be reliably brought in contact with the wire 18.

Embodiment 2

Figure 5:
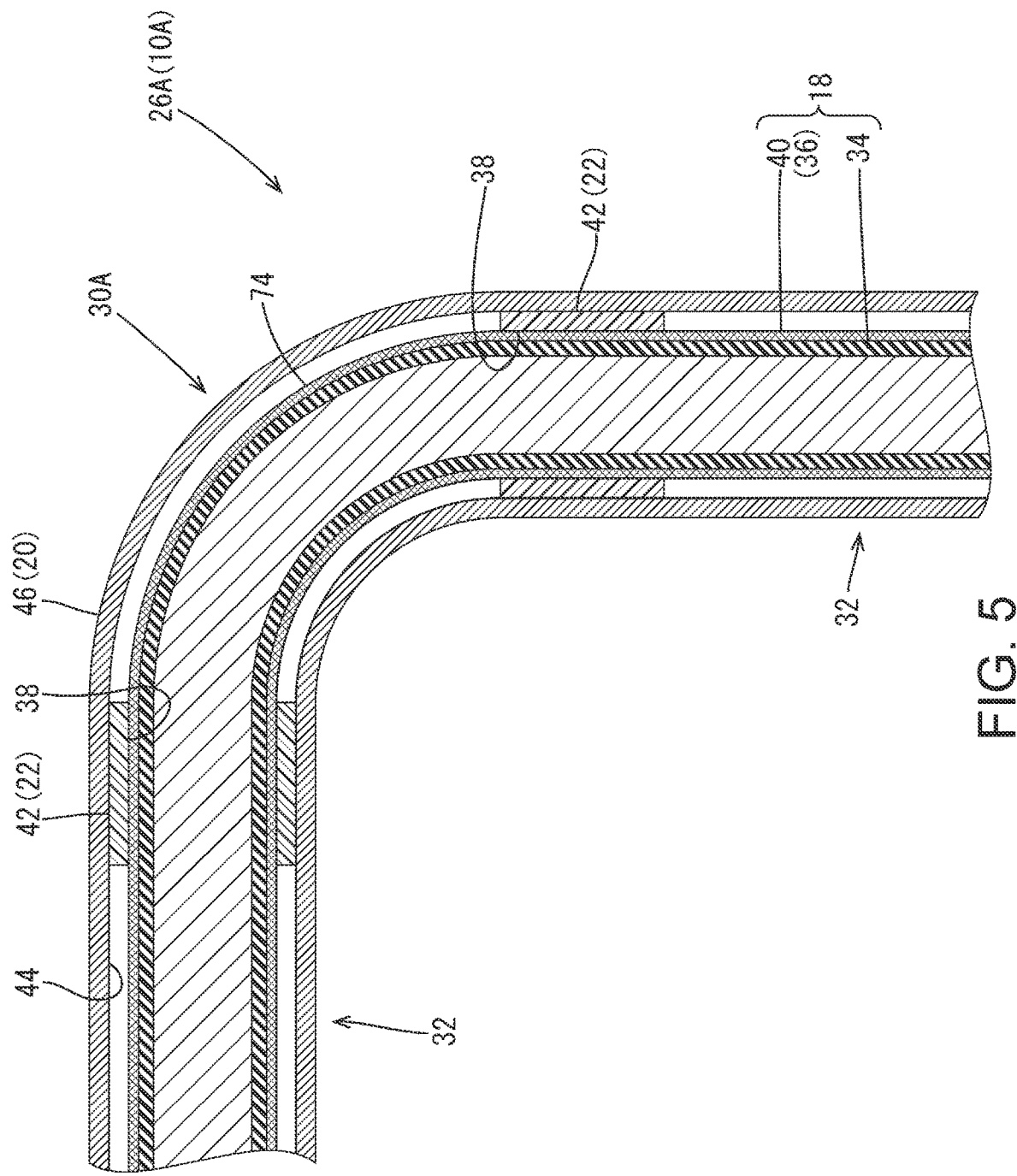
FIG. 5 is a sectional view of the wire harness in Embodiment 2 as seen from the side.

The present embodiment will be described with reference to FIG. 5.

A wire harness 10A of the present embodiment has a configuration in which the heat transfer member 22 is not provided in a position corresponding to a curved part 30A of a bent routing portion 26A, unlike Embodiment 1. The flexibility of the wire harness 10 in the bent routing portion 26 of the wire harness 10A can thereby be further ensured. Since the configuration is otherwise the same as Embodiment 1, the same reference signs as Embodiment 1 are given in FIG. 5 and description thereof will be omitted.

According to the present embodiment as described above, not providing the heat transfer member 22 in a position corresponding to the curved part 30A of the wire harness 10A enables the flexibility of the wire harness 10A in the bent routing portion 26A to be further ensured.

Embodiment 3

Figure 6:
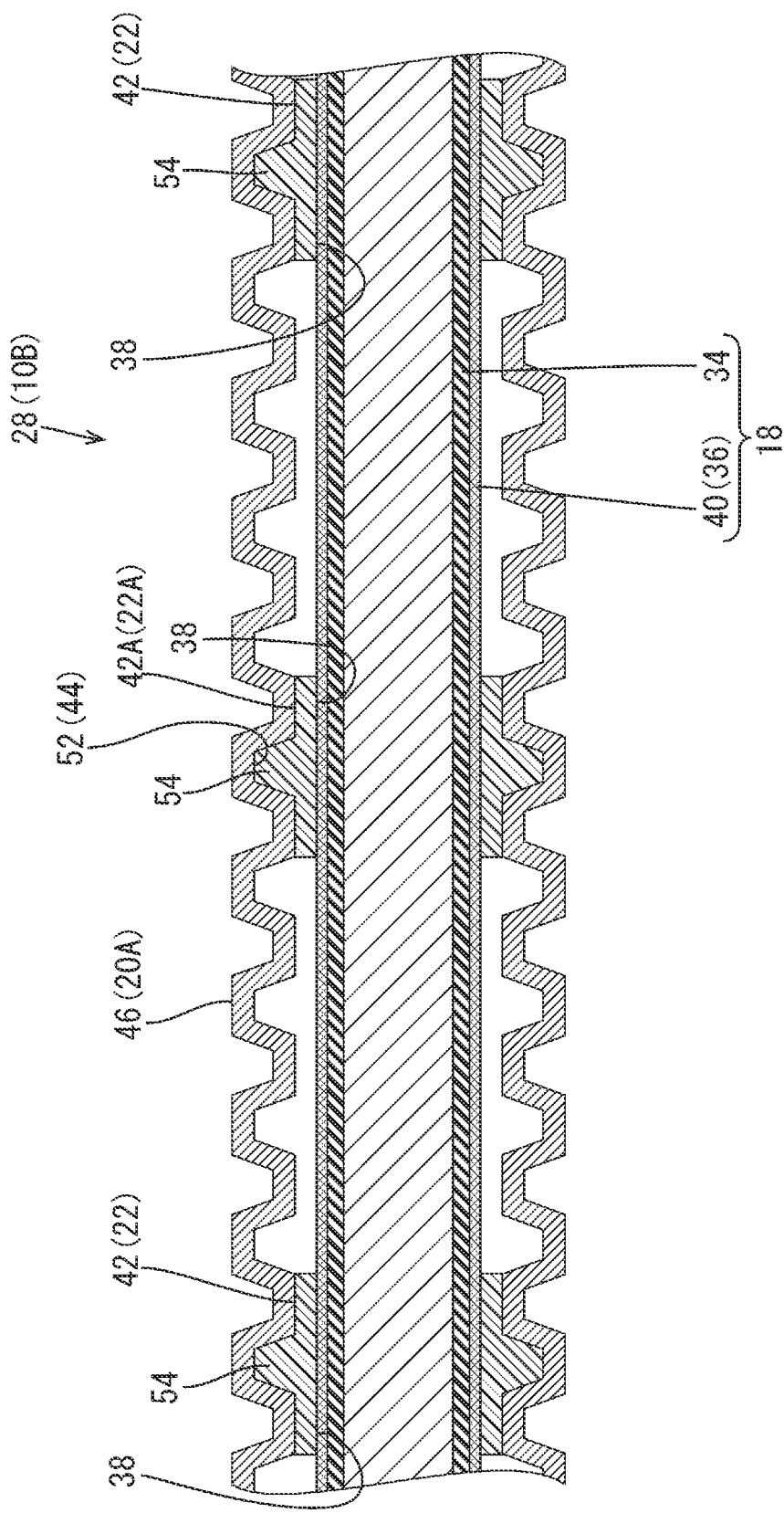
FIG. 6 is a sectional view of the wire harness in Embodiment 3 as seen from the side.

The present embodiment will be described with reference to FIG. 6.

An exterior member 20A of a wire harness 10B of the present embodiment is configured as a tubular corrugated tube having annular raised and recessed corrugations in the extending direction, and the wire 18 is inserted inside the exterior member 20A. A plurality of heat transfer members 22A are provided between the exterior member 20A and the wire 18.

The heat transfer members 22A are arranged at a predetermined interval from each other in the extending direction of the wire 18. A raised part 54 that fits into a recessed part 52 in the exterior member 20A protrudes on an outer peripheral surface 42A of the heat transfer members 22A. The heat transfer members 22A can thereby be prevented from displacing in the extending direction within the exterior member 20A. Since the configuration is otherwise the same as Embodiment 1, the same reference signs as Embodiment 1 are given in FIG. 6 and description thereof will be omitted.

According to the present embodiment as described above, the raised part 54 of the heat transfer members 22A fitting into the recessed parts 52 of the exterior member (corrugated tube) 20A enables the displacement of the heat transfer members 22A in the extending direction within the exterior member (corrugated tube) 20A to be prevented.

Embodiment 4

Figure 7:
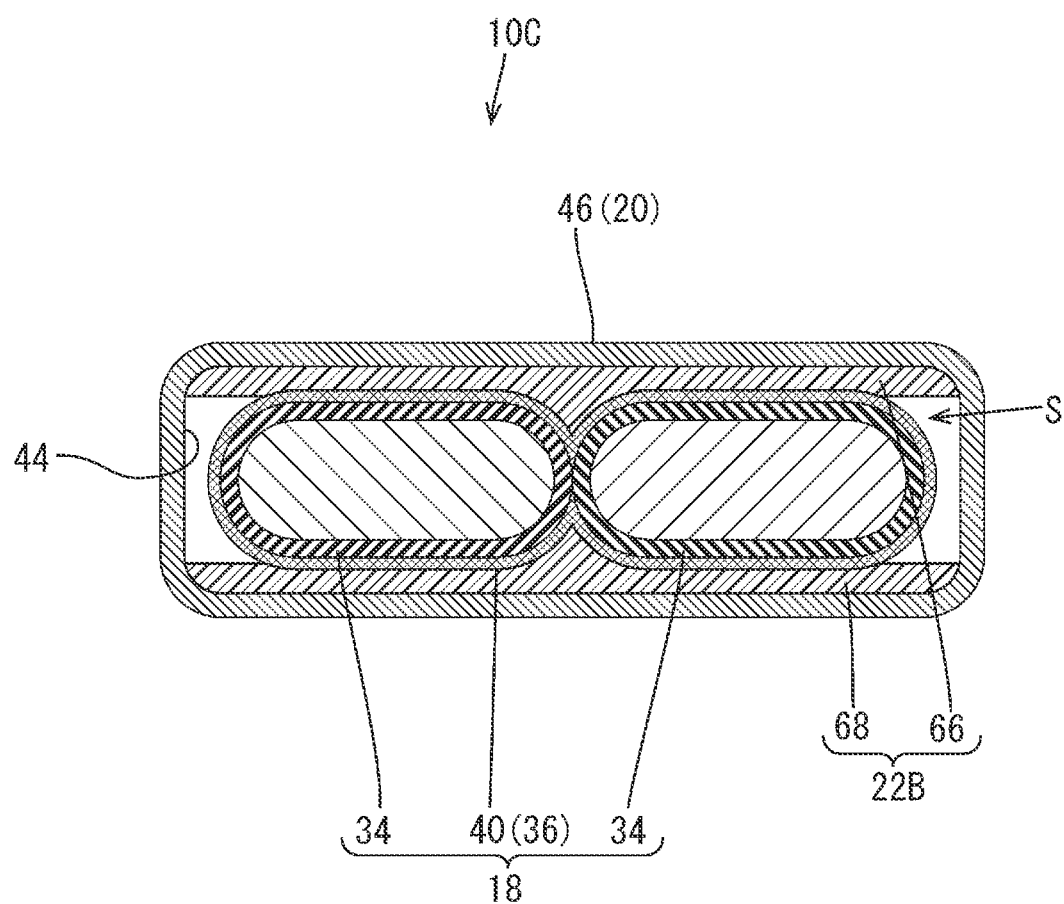
FIG. 7 is a sectional view of the wire harness in Embodiment 4, sectioned at the same position as FIG. 4.

The present embodiment will be described with reference to FIG. 7.

A heat transfer member 22B of a wire harness 10C of the present embodiment is constituted by a tabular first heat transfer member 66 that contacts the outer peripheral surface 40 of the wire 18 from one direction (e.g., from above) and a tabular second heat transfer member 68 that contacts the wire 18 from another direction opposite to the one direction (e.g., from below). The wire 18 is thereby sandwiched by the first heat transfer member 66 and the second heat transfer member 68, thus enabling the heat transfer member 22B to be reliably brought in contact with the wire 18. A gap S is provided between the first heat transfer member 66 and the second heat transfer member 68, and the wire harness 10C can thereby be reduced in weight, as compared with the wire harness 10 of Embodiment 1. Since the configuration is otherwise the same as Embodiment 1, the same reference signs as Embodiment 1 are given in FIG. 7 and description thereof will be omitted.

According to the present embodiment as described above, the heat transfer member 22B is constituted by the first heat transfer member 66 that contacts the outer peripheral surface 40 of the wire 18 from one direction and the second heat transfer member 68 that contacts the outer peripheral surface 40 of the wire 18 from another direction, and the wire 18 is sandwiched by the first heat transfer member 66 and the second heat transfer member 68, thus enabling the heat transfer member 22B to be reliably brought in contact with the wire 18.

Other Embodiments

The technology disclosed in the present specification is not limited to the embodiments illustrated in the above description and drawings, and various modes such as the following, for example, are also included.

Figure 8:
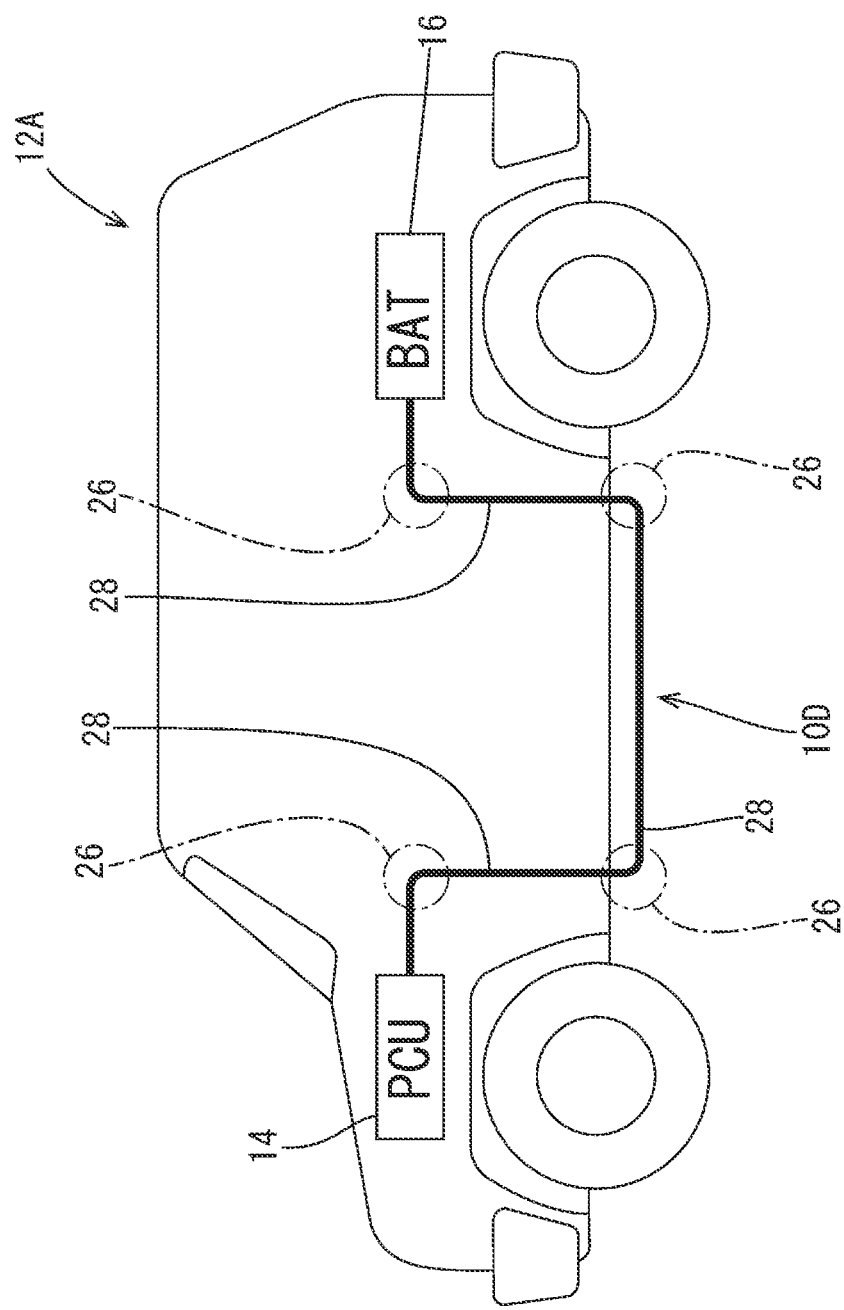
FIG. 8 is a diagram of the wire harness routed in a vehicle in another embodiment (1).

(1) The wire harnesses 10, 10A, 10B and 10C in Embodiments 1 to 4 connect between the PCU 14 in the engine room and the battery 16 provided near the middle of the vehicle 12, but, as shown in FIG. 8, the battery 16 may be configured to be provided in the rear of the vehicle 12A, and a wire harness 10D may be configured to be routed under the floor from the PCU 14 in the engine room and, furthermore, connected to the battery 16 in the rear of the vehicle 12A.

(2) The exterior members 20 and 20A in Embodiments 1 to 4 are corrugated tubes, but the present disclosure is not limited thereto, and may, for example, be applied to a tubular pipe, a vinyl tube or the like having flexibility.

Figure 9:
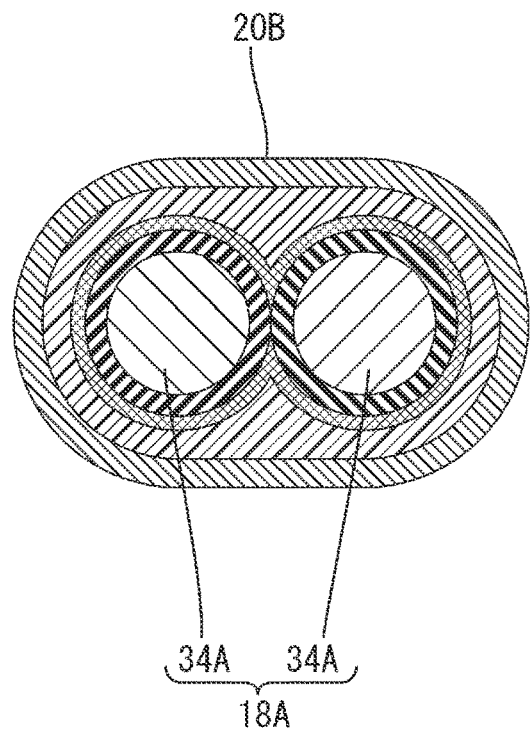
FIG. 9 is a sectional view of the wire harness in another embodiment (3), sectioned at the same position as FIG. 4.
Figure 10:
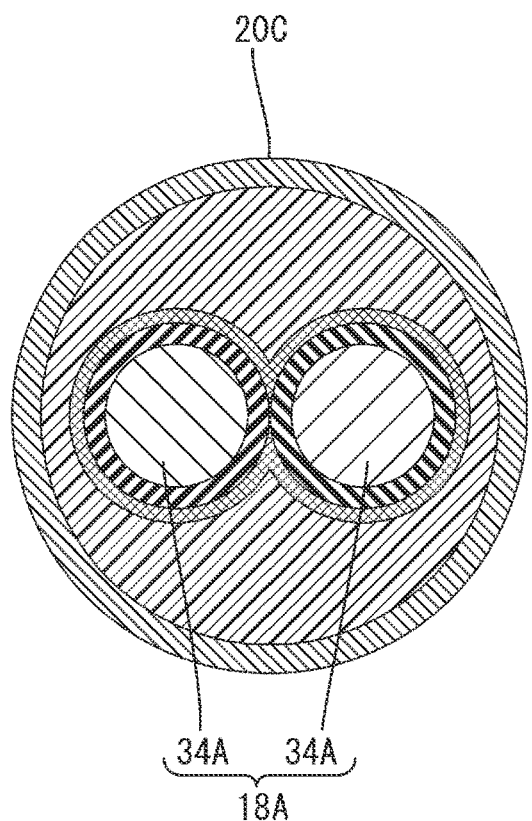
FIG. 10 is a sectional view of the wire harness in another embodiment (3), sectioned at the same position as FIG. 4.

(3) The pair of coated wires 34 in Embodiments 1 to 4 are oval in cross-section, but, as shown in FIG. 9, the present disclosure may be applied to a wire 18A having a pair of coated wires 34A that are circular in cross-section. Also, in Embodiments 1 to 4, the exterior members 20 and 20A have a rectangular tubular shape, but, as shown in FIG. 9, an exterior member 20B may be configured to have an oval tubular shape, or, as shown in FIG. 10, an exterior member 20C may be configured to have a circular tubular shape.

Figure 11:
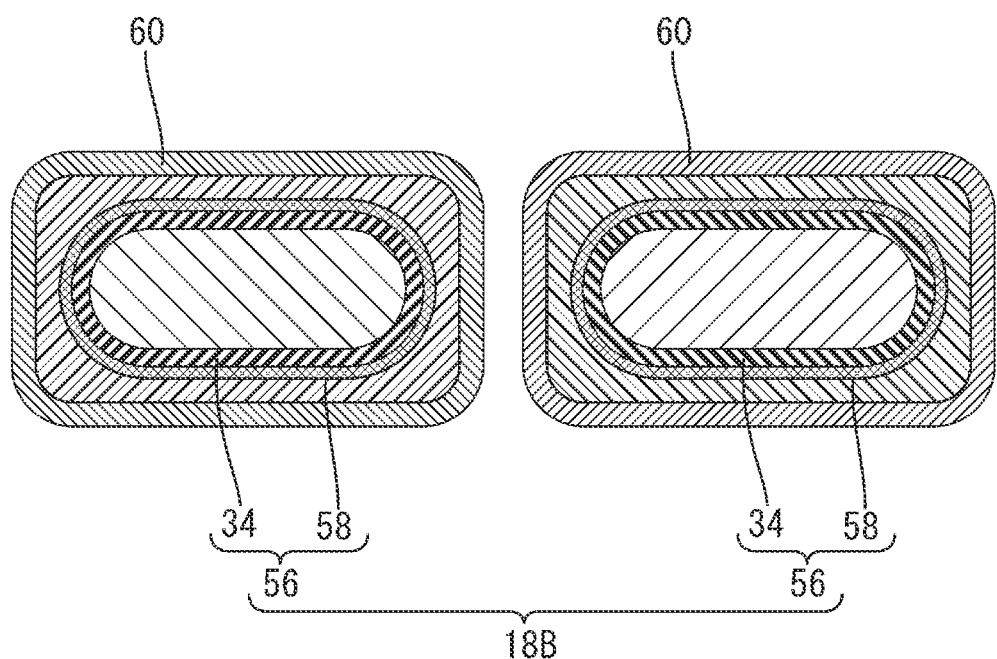
FIG. 11 is a sectional view of the wire harness in another embodiment (4), sectioned at the same position as FIG. 4.
Figure 12:
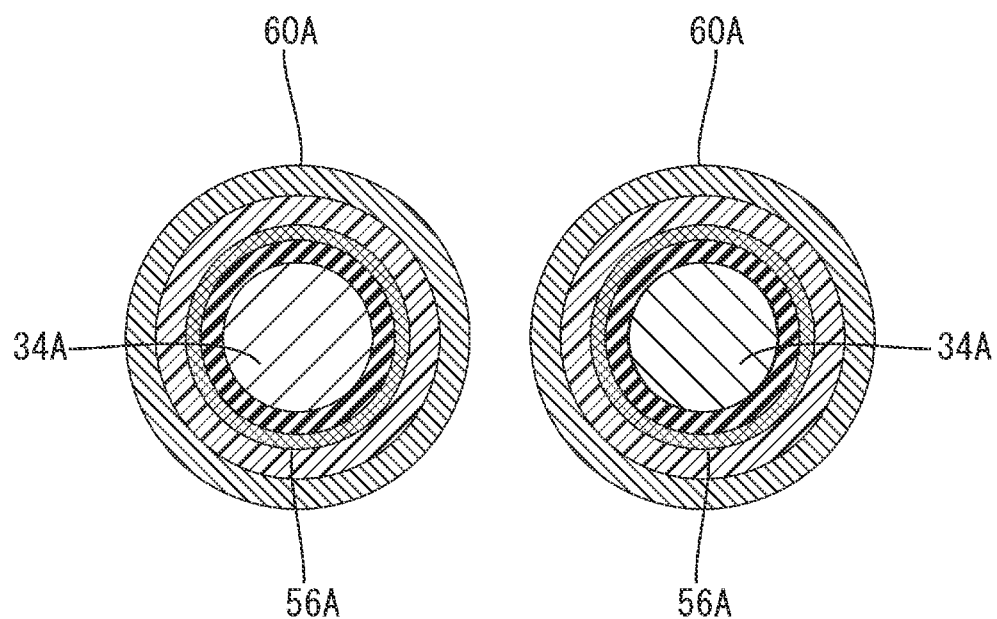
FIG. 12 is a sectional view of the wire harness in another embodiment (4), sectioned at the same position as FIG. 4.

(4) The wire 18 in Embodiments 1 to 4 is constituted by the pair of coated wires 34 and the shield member 36 that collectively encloses the pair of coated wires 34, and is inserted into a single exterior member 20, but, as shown in FIG. 11, a wire 18B may be constituted by a pair of individual wires 56 that are each independent. In this case, the pair of individual wires 56 are each configured to have an individual shield member 58 that individually shields the respective coated wire 34, and, furthermore, to be respectively inserted into a pair of individual exterior members 60 having a rectangular tubular shape. Also, as shown in FIG. 12, a pair of individual wires 56A may be configured to individually shield a pair of coated wires 34A that are circular in cross-section. Also, a pair of individual exterior members 60A into which the pair of individual wires 56A are respectively inserted may be configured to have a circular tubular shape.

Figure 13:
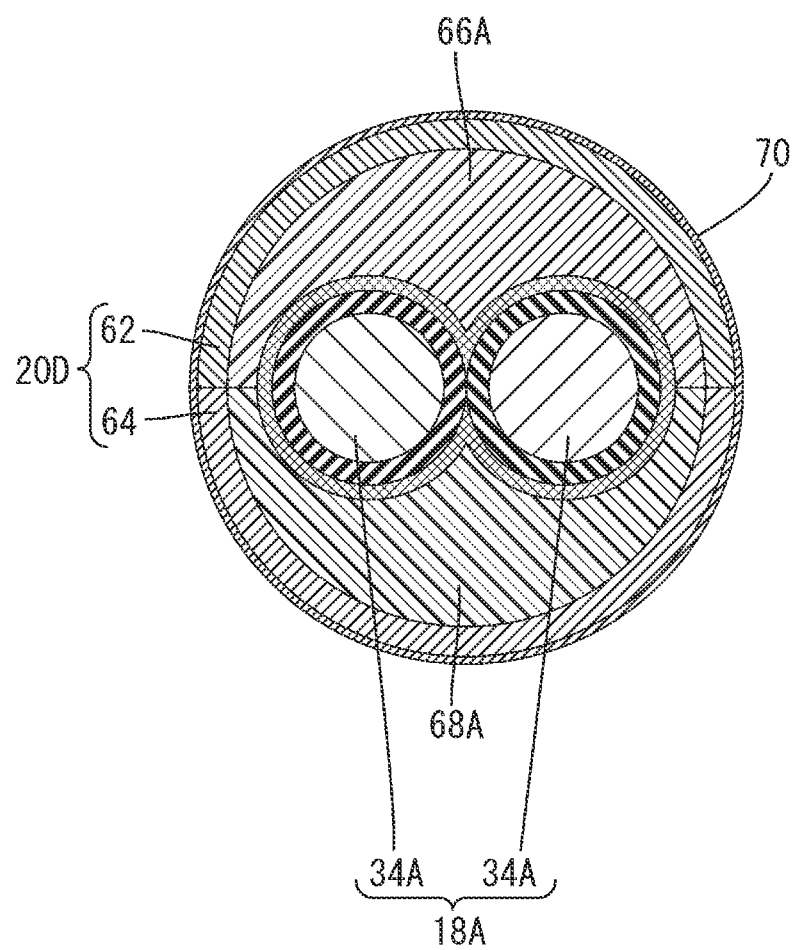
FIG. 13 is a sectional view of the wire harness in another embodiment (5), sectioned at the same position as FIG. 4.

(5) In Embodiment 4, the heat transfer member 22B is constituted by the tabular first heat transfer member 66 that contacts the outer peripheral surface 40 of the wire 18 from one direction and the tabular second heat transfer member 68 that contacts the wire 18 from another direction opposite to the one direction, and the gap S is provided between the first heat transfer member 66 and the second heat transfer member 68, but, as shown in FIG. 13, a configuration may be adopted in which the gap S is not provided between a first heat transfer member 66A and a second heat transfer member 68A. Also, an exterior member 20D may be constituted by a first exterior member 62 that contacts the first heat transfer member 66A from one direction and a second exterior member 64 that contacts the second heat transfer member 68A from another direction. Also, a configuration may be adopted in which the first heat transfer member 66A and the second heat transfer member 68A are brought in contact with the wire 18A and also the first exterior member 62 and the second exterior member 64, by winding a tape 70 around the outer periphery of the first exterior member 62 and the second exterior member 64. Also, a configuration may be adopted in which a band clip, a tie band or the like is used rather than the tape 70.

Figure 14:
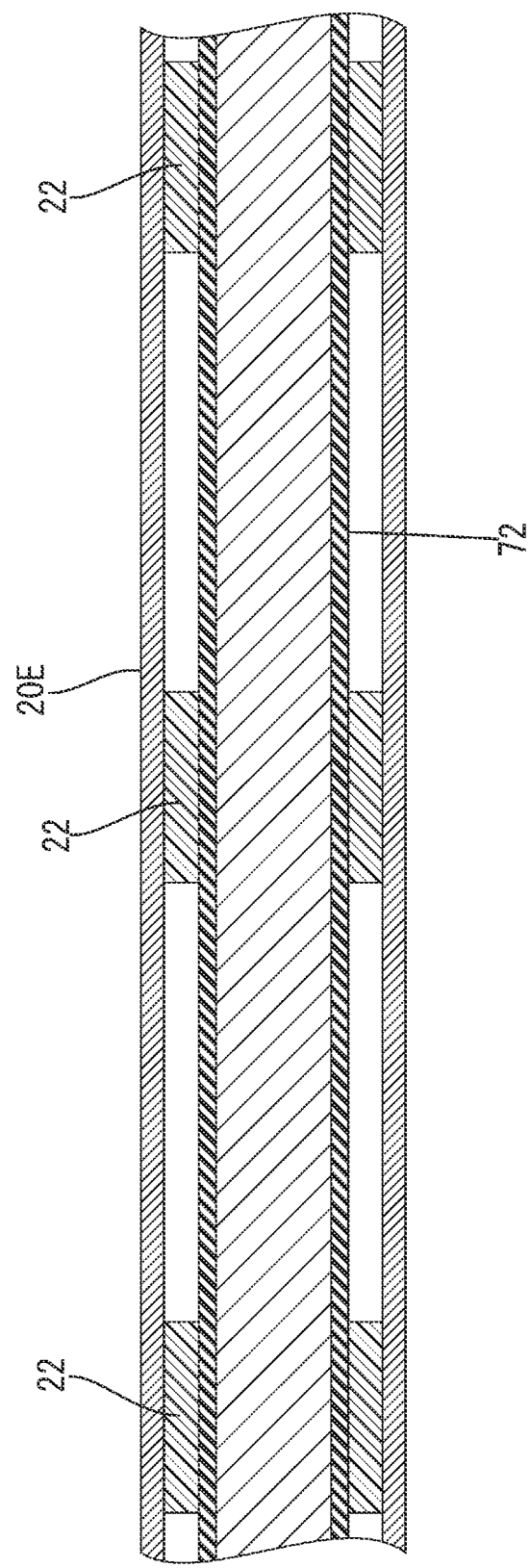
FIG. 14 is a sectional view the wire harness in another embodiment (6) as seen from the side.

(6) In Embodiments 1 to 4, the wire is the wire 18 provided with the shield member 36, but, as shown in FIG. 14, the present disclosure may be applied to a common wire 72 that does not have the shield member 36. In this case, an exterior member 20E is configured to have a shield function by being constituted by a metal member.

(7) The wire harnesses 10, 10A, 10B and 10C in Embodiments 1 to 4 connect between the PCU 14 in the engine room and the battery 16 provided near the middle of the vehicle 12, but are not limited thereto, and can be appropriately used as a wire harness connecting between two devices. For example, the present disclosure may be applied to a wire harness connecting between a battery and a JIB (Junction Box).

(8) In Embodiments 1 and 2, the heat transfer members 22 are arranged in the bent routing portion 26 and the straight routing portion 28 at a predetermined interval from each other in the extending direction of the wire 18, but the heat transfer members may be configured to be arranged one for every bent routing portion, and to not be arranged in the straight routing portion.

(9) In the above embodiments, the heat transfer members 22, 22A and 22B are made of silicone rubber, but may be made of a resin material other than silicone rubber, or may be made of metal or ceramic.

(10) In the above embodiments, a plurality of heat transfer members 22, 22A and 22B are provided in the straight routing portion 28 and each of the bent routing portions 26 and 26A, but a configuration may be adopted in which only one heat transfer member is provided in the straight routing portion or only one heat transfer member is provided in the bent routing portion, for example.

(11) In the above embodiments, the heat transfer members 22, 22A and 22B are provided in the straight routing portion 28 and each of the bent routing portions 26 and 26A, but a configuration may be adopted in which the heat transfer member is only provided in the straight routing portion and is not provided in the bent routing portion, for example.

(12) In the above embodiments, the band clip 23 is provided in a position corresponding to the heat transfer members 22, but a configuration may be adopted in which a band clip is provided in a position not corresponding to heat transfer members, for example.

(13) In the above embodiments, the wire 18 is a stranded wire, but the wire may be configured to be a rod-like solid wire or may be configured to be a tubular pipe conductor, for example.

The invention claimed is:
1. A wire harness having a bent router configured to be routed in a bent manner in a vehicle, the wire harness comprising:

a wire;
an exterior tube enclosing an outer peripheral surface of the wire;
fixing members attached on an outer peripheral surface of the exterior tube and configured to be fixed to the vehicle; and
a plurality of heat transfer tubes provided between the wire and the exterior tube such that the heat transfer tubes are arranged at intervals throughout the wire harness in an extending direction of the wire and contact both the outer peripheral surface of the wire and an inner peripheral surface of the exterior tube, wherein:
the wire has exposed parts not covered by the heat transfer tubes,
the heat transfer tubes each have a rectangular tubular shape, and
the fixing members are attached on the outer peripheral surface of the exterior tube at positions corresponding to the heat transfer tubes, respectively.

2. The wire harness according to claim 1, wherein:
the bent router includes a curved part that is curved and a non-curved part that is located on both sides of the curved part and is not curved, and
none of the heat transfer tubes are provided in a position corresponding to the curved part.

3. The wire harness according to claim 1, wherein:
the exterior tube is a corrugated tube having annular raised and recessed corrugations in an extending direction of the exterior tube, and
each of the heat transfer tubes has a raised part that fits into a recessed part in the corrugated tube and prevents displacement in the extending direction of the exterior tube.

4. The wire harness according to claim 1,
wherein at least one of the heat transfer tubes is arranged in the bent router.

5. The wire harness according to claim 1, wherein:
each of the fixing members is a band clip having a band part binding the exterior tube, and
the inner peripheral surface of the exterior tube is displaced radially inward and contacts one of the heat transfer tubes due to the exterior tube being bound by the band part.

6. The wire harness according to claim 1, wherein the fixing members positioned to correspond to the heat transfer tubes are so configured to enable heat conducted from the wire to the heat transfer tubes to the exterior tube to be further conducted to the fixing members and dissipated from the fixing members.

7. A wire harness having a bent router configured to be routed in a bent manner in a vehicle, the wire harness comprising:
a wire;
an exterior tube enclosing an outer peripheral surface of the wire;
fixing members attached on an outer peripheral surface of the exterior tube and configured to be fixed to the vehicle; and
a plurality of heat transfer tubes provided between the wire and the exterior tube such that the heat transfer tubes are arranged at intervals throughout the wire harness in an extending direction of the wire and contact both the wire and the exterior tube, wherein:
the wire has exposed parts not covered by the heat transfer tubes,
the bent router includes a curved part that is curved and a non-curved part that is located on both sides of the curved part and is not curved,
at least one of the heat transfer tubes is arranged in the non-curved part of the bent router and none of the heat transfer tubes are arranged in the curved part, and
the fixing members are attached on the outer peripheral surface of the exterior tube at positions corresponding to the heat transfer tubes, respectively.

8. The wire harness according to claim 7, wherein:
an inner peripheral surface of the exterior tube contacts an entire periphery of each of the heat transfer tubes, and
each of the heat transfer tubes contacts an entire periphery of the outer peripheral surface of the wire.

9. The wire harness according to claim 8, wherein:
the exterior tube is a corrugated tube having annular raised and recessed corrugations in an extending direction of the exterior tube, and
each of the heat transfer tubes has a raised part that fits into a recessed part in the corrugated tube and prevents displacement in the extending direction of the exterior tube.

10. The wire harness according to claim 7,
wherein each of the heat transfer tubes includes a first heat transfer tube contacting the outer peripheral surface of the wire from one direction and a second heat transfer tube contacting the outer peripheral surface of the wire from another direction opposite to the one direction, and the wire is sandwiched by the first heat transfer tube and the second heat transfer tube.

11. The wire harness according to claim 7, wherein the fixing members positioned to correspond to the heat transfer tubes are so configured to enable heat conducted from the wire to the heat transfer tubes to the exterior tube to be further conducted to the fixing members and dissipated from the fixing members.

12. A wire harness having a bent router configured to be routed in a bent manner in a vehicle, the wire harness comprising:
a wire;
an exterior tube enclosing an outer peripheral surface of the wire;
fixing members attached on an outer peripheral surface of the exterior tube and configured to be fixed to the vehicle; and
a plurality of heat transfer tubes provided between the wire and the exterior tube such that the heat transfer tubes are arranged at intervals throughout the wire harness in an extending direction of the wire and contact both the wire and the exterior tube, wherein:
the wire has exposed parts not covered by the heat transfer tubes,
the exterior tube is a corrugated tube having annular raised and recessed corrugations in an extending direction of the exterior tube,
each of the heat transfer tubes has a raised part that fits into a recessed part in the corrugated tube and prevents displacement in the extending direction of the exterior tube,
an outer peripheral surface of each of the heat transfer tubes located on both sides of the raised part contacts an opening edge of the recessed part of the corrugated tube, and
the fixing members are attached on the outer peripheral surface of the exterior tube at positions corresponding to the heat transfer tubes, respectively.

13. The wire harness according to claim 12, wherein:
an inner peripheral surface of the exterior tube contacts an entire periphery of each of the heat transfer tubes, and
each of the heat transfer tubes contacts an entire periphery of the outer peripheral surface of the wire.

14. The wire harness according to claim 12,
wherein each of the heat transfer tubes includes a first heat transfer tube contacting the outer peripheral surface of the wire from one direction and a second heat transfer tube contacting the outer peripheral surface of the wire from another direction opposite to the one direction, and the wire is sandwiched by the first heat transfer tube and the second heat transfer tube.

15. The wire harness according to claim 12, wherein:
the bent router includes a curved part that is curved and a non-curved part that is located on both sides of the curved part and is not curved, and
none of the heat transfer tubes are provided in a position corresponding to the curved part.

16. The wire harness according to claim 12, wherein the fixing members positioned to correspond to the heat transfer tubes are so configured to enable heat conducted from the wire to the heat transfer tubes to the exterior tube to be further conducted to the fixing members and dissipated from the fixing members.

\* \* \* \* \*